United States Patent
Wang et al.

(10) Patent No.: US 9,649,827 B2
(45) Date of Patent: *May 16, 2017

(54) MOLDING PACKAGING MATERIAL AND MOLDED CASE

(71) Applicant: SHOWA DENKO PACKAGING CO., LTD., Isehara-shi, Kanagawa (JP)

(72) Inventors: Honglin Wang, Isehara (JP); Yuji Minamibori, Isehara (JP)

(73) Assignee: Showa Denko Packaging Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,498

(22) Filed: Sep. 29, 2015

(65) Prior Publication Data

US 2016/0089861 A1    Mar. 31, 2016

(30) Foreign Application Priority Data

Sep. 30, 2014    (JP) .................................. 2014-200099

(51) Int. Cl.
 *B32B 15/08*    (2006.01)
 *H01M 2/02*    (2006.01)
 (Continued)

(52) U.S. Cl.
 CPC ................ *B32B 15/08* (2013.01); *B32B 7/12* (2013.01); *B32B 15/06* (2013.01); *B32B 15/18* (2013.01); *B32B 15/20* (2013.01); *B32B 25/08* (2013.01); *B32B 27/08* (2013.01); *B32B 27/304* (2013.01); *B32B 27/308* (2013.01); *B32B 27/32* (2013.01); *B32B 27/322* (2013.01); *B32B 27/36* (2013.01); *B32B 27/38* (2013.01); *B32B 27/40* (2013.01); *H01M 2/0287* (2013.01); *H01M 2/0292* (2013.01); *H01M 10/0525* (2013.01); *B32B 15/088* (2013.01); *B32B 15/095* (2013.01); *B32B 27/34* (2013.01); *B32B 2250/03* (2013.01); *B32B 2255/10* (2013.01); *B32B 2255/26* (2013.01); *B32B 2264/10* (2013.01);
 (Continued)

(58) Field of Classification Search
 CPC .. H01M 2/0292; H01M 2/0287; B32B 15/095
 See application file for complete search history.

(56) References Cited

U.S. PATENT DOCUMENTS

2006/0288648 A1* 12/2006 Thurber .................... B24D 3/28
                                                51/295
2012/0135301 A1*  5/2012 Akita .................. H01M 2/0212
                                                429/185
2014/0072864 A1   3/2014 Suzuta et al.

FOREIGN PATENT DOCUMENTS

JP    2000-123799 A    4/2000
JP    2011-054563 A    3/2011
(Continued)

*Primary Examiner* — Rena D Cronin
(74) *Attorney, Agent, or Firm* — Keating and Bennett, LLP

(57) ABSTRACT

A molding packaging material includes an outer substrate layer made of a heat-resistant resin, an inner sealant layer made of a thermoplastic resin, a metallic foil layer provided between the outer substrate layer and the inner sealant layer, and a protection coat layer formed on a side opposite to the metallic foil layer side of the outer substrate layer. The protection coat layer is made of a resin composition including a main resin containing a phenoxy resin and a urethane resin, and a curing agent, and has a thickness of 0.1 μm to 10 μm.

8 Claims, 1 Drawing Sheet

(51) Int. Cl.
*B32B 15/095* (2006.01)
*H01M 10/0525* (2010.01)
*B32B 7/12* (2006.01)
*B32B 15/06* (2006.01)
*B32B 15/18* (2006.01)
*B32B 15/20* (2006.01)
*B32B 25/08* (2006.01)
*B32B 27/08* (2006.01)
*B32B 27/30* (2006.01)
*B32B 27/32* (2006.01)
*B32B 27/36* (2006.01)
*B32B 27/38* (2006.01)
*B32B 27/40* (2006.01)
*B32B 27/34* (2006.01)
*B32B 15/088* (2006.01)

(52) U.S. Cl.
CPC ..... *B32B 2307/306* (2013.01); *B32B 2307/31* (2013.01); *B32B 2307/514* (2013.01); *B32B 2307/584* (2013.01); *B32B 2307/714* (2013.01); *B32B 2307/7244* (2013.01); *B32B 2307/7246* (2013.01); *B32B 2439/00* (2013.01); *B32B 2439/70* (2013.01); *B32B 2439/80* (2013.01); *B32B 2457/10* (2013.01)

(56) References Cited

FOREIGN PATENT DOCUMENTS

| | | |
|---|---|---|
| JP | 2014-017266 A | 1/2014 |
| WO | 2012/133663 A1 | 10/2012 |

* cited by examiner

MOLDING PACKAGING MATERIAL AND MOLDED CASE

BACKGROUND OF THE INVENTION

Field of the Invention

The present disclosure relates to a molding packaging material and a molded case preferably for use as a case for a lithium-ion secondary battery for use in, e.g., laptop computers, mobile phones, automobiles, and stationary devices, and also preferably for use as a packaging material for food products or pharmaceutical products.

Description of the Related Art

The following description of related art sets forth the inventors' knowledge of related art and certain problems therein and should not be construed as an admission of knowledge in the prior art.

As the aforementioned molding packaging material, a packaging material is known in which a metallic foil layer as a barrier layer is provided between an outer layer made of heat resistant resin and an inner layer made of thermoplastic resin, and these layers are integrally laminated (see Patent Documents 1 to 4). Further, it is proposed to improve the quality of the molding packaging material by further laminating a layer on the outside of the outer layer.

In the molding packaging material of Patent Documents 2 and 3, it is described that the moldability and the durability are improved by subjecting the outer layer to a protection process or by providing a matte coat layer. Further, it is also described that forming a matte coat layer improves the outer appearance quality of the packaging material, and prevents adherence of the packaging materials to each other, facilitating the handling. The aforementioned matte coat layer is made of a resin composition in which solid fine particles are dispersed in a resin. As the resin, acrylic resin, urethane-based resin, alkyd-based resin, fluoride-based resin, etc., are used, and as the solid fine particles, silica, kaolin, etc., are used.

It is described that, in the packaging material of Patent Document 4, the electrolyte resistance is improved by using a film formed by coextruding a polyester resin layer/an adhesive resin/a polyamide layer as an outermost heat resistant resin layer.

PRIOR ART DOCUMENTS

Patent Documents

[Patent Document 1] Japanese Unexamined Laid-open Patent Application Publication No. 2000-123799
[Patent Document 2] International Publication WO 2012/133663 A1
[Patent Document 3] Japanese Unexamined Laid-open Patent Application Publication No. 2011-054563
[Patent Document 4] Japanese Unexamined Laid-open Patent Application Publication No. 2014-017266

In a production of a battery in which a molding packaging material including a polyamide film laminated as an outer layer is used as an packaging material of a lithium-ion battery, the electrolyte may adhere to the polyamide film, causing swelling of the surface, or scratches may be formed on the surface from contact with an equipment during the battery production, which may cause deterioration of the outer appearance quality. Further, discoloration may sometimes occur by adherence of the electrolyte. To prevent such deterioration of the outer appearance quality, normally, when producing a battery, a masking tape is pasted on a battery case after molding to protect the outer surface, and the masking tape is removed after producing the battery. With such a protection operation, there are problems that the workability of the battery production is largely impaired, and the cost is increased since the masking tape is disposed.

Further, when a battery element is introduced in a molded packaging material and the battery element is sealed by heat sealing the edge part of the packaging material, there were such problems that the polyamide film of the outer layer is melted and soften, resulting in non-peeling from the heat sealing bar, or deterioration of the outer appearance of the sealed surface after peeling.

Furthermore, when the polyamide film absorbs moisture (or dries) to thereby expand (or shrink), there is also a problem that the molding packaging material curls.

The packaging materials of Patent Documents 2 to 4 have some protection functions against the polyamide film by further laminating a layer on the outside of the polyamide film, but these protection layers have respective problems and their protection functions are not sufficient.

A urethane-based resin is flexible and excellent in moldability is obtained, but there are problems in chemical resistance and solvent resistance, so the electrolyte resistance required for a battery case is insufficient.

In a lamination method in which a polyester resin layer and a polyamide resin layer are coextruded via an adhesive resin layer, although the chemical resistance and the solvent resistance can be improved, the cost is high and the moldability deteriorates.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

In view of the aforementioned technical background, some embodiments of the present invention aim to provide a molding packaging material equipped with a protection coat layer having excellent moldability, chemical resistance, solvent resistance, and scratch resistance and its related technologies.

That is, some embodiments of the present invention have the structure as recited in the following items [1] to [6].

[1] A molding packaging material comprising:
an outer substrate layer made of a heat-resistant resin;
an inner sealant layer made of a thermoplastic resin;
a metallic foil layer arranged between the outer substrate layer and the inner sealant layer; and
a protection coat layer formed on a side opposite to the metallic foil layer side of the outer substrate layer,
wherein the protection coat layer is made of a resin composition including a main resin containing a phenoxy resin and a urethane resin, and a curing agent, and has a thickness of 0.1 μm to 10 μm.

[2] The molding packaging material as recited in the aforementioned Item [1], wherein a mass ratio of the phenoxy resin and the urethane resin in the main resin is 0.6 to 1.6 urethane resin to 1 phenoxy resin.

[3] The molding packaging material as recited in the aforementioned Items [1] or [2], wherein the outer substrate layer is made of a polyamide resin.

[4] The molding packaging material as recited in any one of the aforementioned Items [1] to [3], wherein a thickness of the metallic foil layer is 10 μm to 40 μm.

[5] A molded case made by subjecting the molding packaging material as recited in any one of the aforementioned Items [1] to [4] to deep-drawing or bulging.

[6] The molded case as recited in the aforementioned Item [5], wherein the molded case is used as a battery case.

According to the molding packaging material as recited in the aforementioned Item [1], since a mixed resin of a highly stable phenoxy resin and a highly flexible urethane resin is used as the main resin of a resin forming the protection coat layer, a molding packaging material having all of moldability, chemical resistance, solvent-resistance, and scratch-resistance can be obtained.

The molding packaging material as recited in the aforementioned Item [2] can be used as a protection coat layer especially excellent in the balance of moldability, chemical resistance, and solvent resistance by the mixing ratio of the phenoxy resin and the urethane resin in the main resin.

The molding packaging material as recited in the aforementioned Item [3] can be used as a molding packaging material which is especially excellent in moldability and strength since the outer substrate layer is constituted by a polyamide resin.

The molding packaging material as recited in the aforementioned Item [4] can be used as a molding packaging material especially excellent in moldability since the thickness of the metallic foil layer is set within a range of 10 μm to 40 μm.

According to the invention as recited in the aforementioned Item [5], a molded case having all of moldability, chemical resistance, solvent resistance, and scratch resistance is provided.

According to the invention as recited in the aforementioned Item [6], a battery case having all of moldability, chemical resistance, solvent resistance, and scratch resistance is provided. Further, since the outer substrate layer is protected by the protection coat layer, deterioration of the outer appearance quality due to the adherence of electrolytes or contact with a production equipment at the time of producing the battery can be prevented.

BRIEF DESCRIPTION OF THE DRAWINGS

The disclosed embodiments of the present invention are shown by way of example, and not limitation, in the accompanying figures.

EMBODIMENTS FOR CARRYING OUT THE INVENTION

In the following paragraphs, some embodiments of the invention will be described by way of example and not limitation. It should be understood based on this disclosure that various other modifications can be made by those in the art based on these illustrated embodiments.

[Molding Packaging Material]

Figure 1:
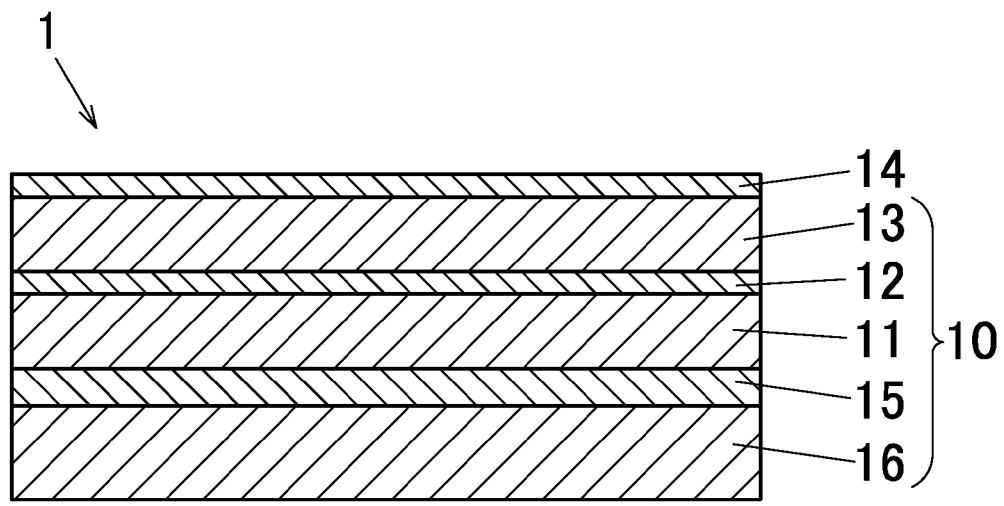
FIG. 1 is a cross-sectional view showing an embodiment of a molding packaging material according to the present invention.

FIG. 1 shows an embodiment of the molding packaging material 1 according to the present invention. The molding packaging material 1 is used as a packaging material for a lithium-ion secondary battery case. That is, the molding packaging material 1 is subjected to forming such as deep-drawing, bulging, etc., and used as a secondary battery case.

In the molding packaging material 1, an outer substrate layer 13 is integrally laminated on one of surfaces of the metallic foil layer 11 via an outer adhesive agent layer 12, and a protection coat layer 14 is formed on the outer surface of the outer substrate layer 13, i.e., the surface of the outer substrate layer opposite to the metallic foil layer 11. Further, an inner sealant layer 16 is integrally laminated on the other surface of the metallic foil layer 11 via an inner adhesive agent layer 15.

Hereinafter, each layer will be detailed.

(Outer Substrate Layer)

The outer substrate layer 13 is made of a heat-resistant resin. As the heat-resistant resin, a resin that does not melt at a heat sealing temperature when heat sealing the molding packaging material 1 is used. As the heat-resistant resin, it is preferable to use a heat-resistant resin having a melting point higher than the melting point of the thermoplastic resin constituting the inner sealant layer 16 by 10° C. or more, and especially preferable to use a heat-resistant resin having a melting point higher than the melting point of the thermoplastic resin by 20° C. or more. The type of the heat-resistant resin is not especially limited, but, for example, a polyamide film, a polyester film, etc., can be exemplified, and these stretched films are preferably used. Among them, in terms of formability and strength, it is especially preferable to use a biaxially stretched polyamide film, a biaxially stretched polybutylene terephthalate (PBT) film, a biaxially stretched polyethylene terephthalate (PET) film, or biaxially stretched polyethylene naphthalate (PEN) film. As the polyamide film, it is not especially limited, but, for example, a polyamide 6 film, a polyamide 6,6 film, an MXD polyamide film, etc., are exemplified. Further, the outer substrate layer 13 can be formed as a single layer, or a multi-layer made of, for example, a PET film/polyamide film.

It is preferable that the thickness of the outer substrate layer 13 is 9 μm to 50 μm. In the case of using a polyester film, it is preferable that the thickness is 9 μm to 50 μm, and in the case of using a polyamide film, it is preferable that the thickness is 10 μm to 50 μm. By setting the thickness to the preferred lower limit or higher, a sufficient strength as a packaging material can be secured, and by setting the thickness to the preferred upper limit or lower, the stress at the time of bulging or drawing can be reduced, enabling improved moldability.

(Inner Sealant Layer)

The inner sealant layer 16 is made of a thermoplastic resin, has excellent chemical resistance against, for example, electrolytes strong in corrosiveness used for, e.g., a lithium-ion secondary battery, etc., and also undertakes a role of giving a heat-sealing characteristic to the packaging material.

The thermoplastic resin constituting the inner sealant layer 16 is not especially limited, but it is preferable to be a thermoplastic resin unstretched film. The thermoplastic resin unstretched film is not especially limited, but in terms of chemical resistance and heat-sealing characteristics, it is preferably constituted by an unstretched film made of at least one of thermoplastic resins selected from the group consisting of polyethylene, polypropylene, olefin-based copolymer, and their acid modified materials and ionomers. The inner sealant layer 16 can be a single layer or a multi-layer. As the multi-layer, a three-layer film in which random polypropylene are laminated on both surfaces of a block polypropylene, a two-layer film in which acid-modified polypropylene and random polypropylene are laminated, and a two-layer film in which homo-polypropylene and random polypropylene are laminated, can be exemplified.

It is preferable that the thickness of the inner sealant layer 16 is set to 20 μm to 80 μm. Setting the thickness to 20 μm or more can sufficiently prevent generation of pinholes, and setting the thickness to 80 μm or less can reduce the amount of resin to be used, enabling cost reduction. Above all, it is especially preferable that the thickness of the inner sealant layer 16 is set to 30 μm to 50 μm. Further, the inner sealant layer 16 can be a single layer or a multi-layer.

(Metallic Foil Layer)

The metallic foil layer 11 undertakes a role of providing a gas barrier performance which prevents invasion of oxygen and/or moisture into the molding packaging material 1.

The metallic foil layer 11 is not especially limited, but, for example, an aluminum foil, a copper foil, a nickel foil, a stainless steel foil, their clad foil, or their annealed foil or unannealed foil, etc., can be exemplified, and an aluminum foil is generally used. The thickness of the metallic foil layer 11 is preferably set to 10 μm to 100 μm. Setting the thickness to 10 μm or more prevents generation of pinholes during rolling at the time of producing the metal foil, and setting the thickness to 100 μm or less reduces the stress during bulging or deep-drawing, enabling improvement of moldability.

Also, to improve the moldability, it is preferable that the thickness of the metallic foil is specifically set to 10 μm to 40 μm, more preferably 10 μm to 30 μm.

Further, it is preferable that a chemical conversion film is formed on the surface of the metallic foil layer 11. Each of the outer layer and the inner layer of the molding packaging material 1 is a resin layer, and there is a risk that, although it is a very small amount, light, oxygen and/or liquid may enter these resin layers from the outside of the case, and contents (such as electrolyte of a battery, food products, and pharmaceutical products, etc.) may infiltrate from the inside. When these intruded objects reach the metallic foil layer 11, it becomes the cause of corrosion of the metallic foil layer 11. For the phenomenon, the corrosion-resistance of the metallic foil layer 11 can be improved by forming a chemical conversion film high in corrosion resistance on the surface of the metallic foil layer 11.

The chemical conversion film is a film formed by subjecting the metallic foil surface to a chemical conversion treatment, and, for example, it can be formed by subjecting the metallic foil to a chromate treatment and a non-chromic type chemical conversion treatment using a zirconium compound. For example, in the case of the chromate treatment, after applying a water solution of any one of the following mixtures 1) to 3) described below to the metallic foil surface subjected to a degreasing treatment, it is dried.

1) a mixture of phosphoric acid, chromium acid, and at least one of fluoride metallic salt and fluoride non-metallic salt
2) a mixture of phosphoric acid, any one of acrylic resin, chitosan derivative resin and phenolic resin, and at least one of chromic acid and chromium (III) sulfate
3) a mixture of phosphoric acid, any one of acrylic-based resin, chitosan derivative resin and phenolic resin, at least one of chromic acid and chromium (III) sulfate, and at least one of a metal salt of fluoride and a non-metal salt of fluoride In the chemical conversion film, the chromic adhesion amount is preferable to be 0.1 $mg/m^2$ to 50 $mg/m^2$, more preferably 2 $mg/m^2$ to 20 $mg/m^2$. A chemical conversion film having the aforementioned chromic adhesion amount makes it possible to obtain a highly corrosive resistant molding packaging material.

(Outer Adhesive Agent Layer)

The aforementioned outer adhesive agent layer 12 is a layer which undertakes the role of joining the metallic foil layer 11 and the outer substrate layer 13.

The adhesive agent constituting the outer adhesive agent layer 12 is not especially limited, but, for example, a two-part curing type urethane-based adhesive agent containing a polyol component and an isocyanate component, can be exemplified. The two-part curing type urethane-based adhesive agent is suitably used at the time of adhering especially by a dry laminating method. The polyol composition is not especially limited, but, for example, polyester polyol, polyether polyol, etc., can be exemplified. The isocyanate component is not especially limited, but diisocyanate group, such as, e.g., TDI (tolylene diisocyanate), HDI (hexamethylene diisocyanate), MDI (methylene bis(4, 1-phenylene)diisocyanate) can be exemplified. It is preferable that the thickness of the outer adhesive agent layer 12 is set to 2 μm to 5 μm, and it is especially preferable that it is set to 3 μm to 4 μm.

In addition, in the outer adhesive agent layer 12, as long as it is within a range not inhibiting the effects of the present invention, an anti-blocking agent of inorganic systems or organic systems, and an amide-based slip agent can be added to the constituent resin.

(Inner Adhesive Agent Layer)

The aforementioned inner adhesive agent layer 15 is a layer which undertakes the role of joining the metallic foil layer 11 and the inner sealant layer 16.

The inner adhesive agent layer 15 is not especially limited, but, for example, an adhesive agent layer made of, for example, polyurethane-based adhesive agent, acrylic-based adhesive agent, epoxy-based adhesive agent, polyolefin-based adhesive agent, elastomeric adhesive agent, fluorine-based adhesive agent, etc., can be exemplified. Above all, it is preferable to use an acrylic adhesive agent or a polyolefin-based adhesive agent, and in that case, the electrolyte resistance and vapor barrier property of the packaging material 1 can be improved.

(Protection Coat Layer)

The protection coat layer 14 is a layer formed on the outer surface of the outer substrate layer 13, which provides excellent slipping property to the surface of the molding packaging material 1 to improve the moldability and provides excellent chemical resistance, solvent resistance, and scratch resistance.

Further, since the outer substrate layer 13 is protected by the protection coat layer 14, the deterioration in the outer appearance quality due to adhesion of electrolytes or contact with a production equipment at the time of producing the battery can be prevented when the molding packaging material is used as a battery case material. Furthermore, since a masking tape for protection becomes unnecessary, workability is improved and the cost can be reduced. The outer substrate layer 13 can be protected by the protection coat layer 14 for uses other than batteries as well.

As a resin component of the resin composition, a main resin including phenoxy resin and urethane resin and a curing agent are used.

In the main resin, although the urethane resin is flexible and excellent in moldability, the chemical resistance and the solvent resistance are not sufficient. On the other hand, the phenoxy resin is a linear polymer composed by bisphenol and epichlorohydrin, is strong and stable, and is excellent in thermal stability in a wide range of processing temperatures. Further, since OH groups are contained in the structure, the resin can have excellent adhesion and chemical resistance by cross-linking. The phenoxy resin having the characteristics has excellent chemical resistance and solvent resistance, but it is inferior to the urethane resin in flexibility. In the present invention, by mixing and using two types of resins having contradictory properties, that is, a urethane resin high in flexibility and a phenoxy resin high in chemical resistance and solvent resistance, as a main resin, it can be a resin composition having moldability, chemical resistance, and solvent resistance. Further, either bisphenol A-type phenoxy resin or bisphenol F-type phenoxy resin can be used as the phenoxy resin, and although they can be used together, the bisphenol A-type phenoxy resin is recommended since it is excellent in solvent resistance.

Also, since the urethane resin is extremely good in printability and also the phenoxy resin is good in printability, their mixed resin is also good in printability.

In the main resin, as the content rate of the urethane resin increases, the flexibility increases and the moldability is improved, but since the content rate of the phenoxy resin is relatively reduced, the chemical resistance and the solvent resistance decrease. On the other hand, as the content rate of phenoxy resin increases, the chemical resistance and the solvent resistance improve, but since the content rate of the urethane resin relatively decreases, the degree of improvement of moldability deteriorates. In the present invention, the mixture ratio in the main resin is not limited, but a range of 0.6 to 1.6 urethane resin to 1 phenoxy resin in mass ratio is recommended as a mixture ratio for a good balance of moldability, chemical resistance, and solvent resistance. An especially preferable mass ratio is in a range of 0.8 to 1.4 urethane resin to 1 phenoxy resin.

It is preferable that the thickness of the protection coat layer 14 after curing is 0.1 μm to 10 μm. In a layer thinner than the aforementioned lower limit value, there are less effects of moldability improvement, and chemical resistance and solvent resistance improvements, and in a layer thicker than the upper limit value, the cost increases. An especially preferable thickness is in a range of 2 μm to 5 μm.

Further, a resin containing fluorine and an acrylate resin can be further added to the main resin containing the aforementioned phenoxy resin and urethane resin to further improve the strength and moldability.

Further, the curing agent is not especially limited, but it is preferable to use an isocyanate component. As the isocyanate composition, for example, diisocyanate groups such as TDI (tolylene diisocyanate), HDI (hexamethylene-diisocyanate), MDI (methylenebis(4,1-phenylene)diisocyanate), etc., can be exemplified, and one or more types of mixtures can be used.

It is preferable to blend 5 to 30 mass parts of the curing agent to 100 mass parts of the main resin. If the content of the curing agent is less than 5 mass parts, there is a risk that the adhesiveness to the outer substrate layer 13 and the solvent resistance may decrease. If the content of the curing agent exceeds 30 mass parts, there is a risk that the protection coat layer 14 hardens and the moldability is decreased. The especially preferable blending amount of the curing agent is 10 to 20 mass parts to 100 mass parts of the main resin.

Further, as a physical property of the resin composition including the main resin and the curing agent, it is preferable that the viscosity of a solution having 25 mass % solid content concentration measured with a Zhan cup #4 at 20° C. is in a range of 10 to 30 seconds, especially preferably in a range of 15 to 25 seconds.

Further, the present invention does not exclude resins other than phenoxy resin and urethane resin, or additive agents, and addition of other components are allowed unless moldability, chemical resistance, and solvent resistance are lost.

For example, as the protection coat layer 14, a resin composition in which solid fine particles and/or lubricants are added to the resin composition within a range not deteriorating the gloss and the outer appearance of the resin can be used. By adding solid fine particles and/or lubricants, the slipping property can be applied to the protection coat layer 14 to improve the moldability, and packaging material becomes less likely to stick each other, resulting in easy handling.

As solid fine particles exerting such effects, either inorganic fine particles or organic fine particles can be used, and they can also be used in a mixed manner. Here, as the inorganic fine particles, one or more types of particles of silica, alumina, calcium oxide, calcium carbonate, calcium sulphate, calcium silicate, carbon black, etc., can be used. The use of silica is especially preferred. As the organic fine particles, fine particles of acrylic ester-based compound, polystyrene-based compound, epoxy-based resin, polyamide-based compound, or their cross-linked products, etc., can be used.

For such fine particles, as a particle diameter in which excellent slipping property can be obtained, particles having an average particle diameter of 1 μm to 10 μm are suitably used, and 2 μm to 5 μm is especially preferred. When using fine particles having particle diameters of less than 1 μm, which is too small, they are buried in the coating liquid, so a large amount of fine particles needs to be added to actualize the desired characteristics. Thus, it is hard to obtain sufficient slipping property. On the other hand, when using fine particles having large particle diameters exceeding 10 μm, the particle diameters exceed the coating thickness and easily fall out.

Further, the content rate of the solid fine particles in the resin composition is arbitrarily determined within a range of 0.1 to 10 mass % according to the degree of slipping property desired for the packaging material, the particle diameter, the type of fine particles to be added, etc. When the content rate is less than 0.1 mass %, the improvement effect of slipping property is small, so there is a risk that the improvement effect of moldability cannot be sufficiently obtained. On the other hand, if it is excessively contained, exceeding 10 mass %, the outer appearance may be impaired. The preferable range of the content rate of the fine particles is 0.1 to 5 mass %, and a range of 0.1 to 3 mass % is especially preferable. When using silica as inorganic fine particles, for example, since the particle diameter and the content rate are within the range of the upper and lower limits, the most suitable slipping property can be provided.

It is preferable that the thickness of the protection coat layer 14 after curing is 0.1 μm to 10 μm. In a layer thinner than the aforementioned lower limit value, there is less effect of the slipping property improvement, and in a layer thicker than the upper limit value, the cost increases. The especially preferable thickness is in a range of 2 μm to 5 μm.

(Production of Molding Packaging Material)

The molding packaging material 1 having each of the abovementioned layers can be produced by adhering the outer substrate layer 13 to one of surfaces of the metallic foil layer 11 via the outer adhesive agent layer 12, and adhering the inner sealant layer 16 to the other surface via the inner adhesive agent layer 15 to produce a five-layer laminated body 10, and applying a resin composition for a protection coat layer 14 produced in a paste-form to the surface of the outer substrate layer 13 of the laminated body 10 and then drying it.

In manufacturing the laminated body 10, the pasting method of each layer is not limited, but a method called dry lamination can be exemplified. Specifically, an adhesive agent of the outer adhesive agent layer 12 is applied to the upper surface of the metallic foil layer 11 or the lower surface of the outer substrate layer 13, or both of these surfaces. After evaporating the solvent of the adhesive agent to form a dried film, the metallic foil layer 11 and the outer substrate layer 13 are adhered together. The adhesion of the metallic foil layer 11 and the inner sealant layer 16 can be performed in the same manner, and an adhesive agent of the inner adhesive agent layer 15 is applied to the lower surface of the metallic foil layer 11 or the upper surface of the inner sealant layer 16, or both of these surfaces. After evaporating the solvent to form a dried film, the metallic foil layer 11 and the inner sealant layer 16 are adhered together. Furthermore, by curing according to the curing conditions of the adhesive agent, a five-layer laminated body 10 is produced. The laminated body 10 can also be produced by extruding the outer substrate layer 13 and the outer adhesive agent layer 12, and the inner sealant layer 16 and the inner adhesive agent layer 15, as laminated films using a T-die method, and by thermocompression bonding these laminated films to the metallic foil layer 11. At both surfaces of the metallic foil layer 11, the bonding can also be performed by different methods.

On the other hand, as a material for the protection coat layer 14, a resin composition in which a main resin in which phenoxy resin and urethane resin are mixed, and a curing agent are mixed in a paste-form, or a paste-form resin composition in which solid fine particles are evenly dispersed are prepared.

Then, the resin composition is applied to the surface of the outer substrate layer 13 of the laminated body 10 and dried. The application method of the resin composition is not limited, but, for example, a gravure roll method can be exemplified. When the resin composition dries, the protection coat layer 14 is formed, and the protection coat layer 14 is joined to the outer substrate layer 13, and an expected molding packaging material 1 is produced.

Figure 2:
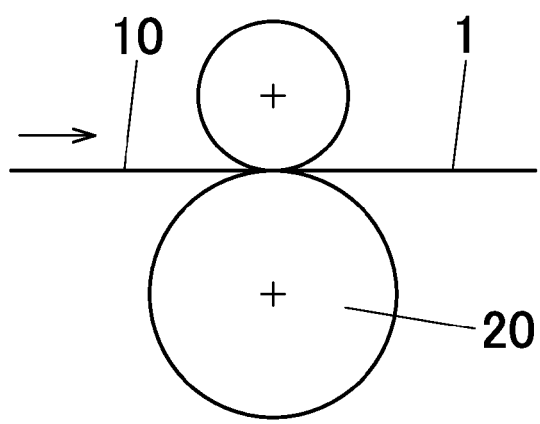
FIG. 2 is a schematic explanatory view showing a production method of a molding packaging material according to the present invention.

As a drying method of the applied resin composition, as shown in FIG. 2, a method in which the laminated body 10 on which the resin composition was applied is heated by a heat roll 20 while being passed through the rolls. In this method, as the roll contacting the resin composition, the heat roll 20 is used, and the roll is heated to, for example, 130° C. to 220° C.

Also, for the molding packaging material of the present invention, the adhesion method of each layer and the forming method of the protection coat layer are not limited to the aforementioned methods and steps, and the present invention includes cases in which other methods and steps are used for manufacturing.

[Molded Case]

By subjecting the molding packaging material 1 of the present invention to forming (such as deep-drawing, bulging, etc.), a molded case such as a battery case can be obtained.

EXAMPLES

Next, specific Examples of the present invention will be explained. It should be, however, noted that the present invention is not specifically limited to these Examples.

Examples 1 to 10

The molding packaging material 1 having the laminated structure as shown in FIG. 1 was produced. In Examples 1 to 10, only the resin composition constituting the protection coat layer 14 or the thickness was different, and the materials and the manufacturing steps of the laminated body 10 excluding the protection coat layer 14 were the same. The material and the manufacturing of the laminated body 10 were as follows.

<Laminated Body>

The metallic foil layer 11 was an aluminum foil having a thickness of 40 μm, and a chemical conversion treatment solution containing polyacrylic acid, trivalent chromium compound, water, and alcohol was applied to both surfaces of the aluminum foil, and it was dried at 180° C. to form a chemical conversion film. In this chemical conversion film, the chromium adhesion amount by the chemical conversion film was 10 mg/m$^2$.

A biaxially stretched polyamide 6 film having a thickness of 25 μm was dry laminated using a two-part curing type urethane-based adhesive agent as an outer substrate layer 13 on one of surfaces of the metallic foil layer 11 in which the chemical conversion film was formed.

Further, a maleic acid-modified polypropylene resin having adhesiveness to both the metallic foil layer 11 and polypropylene as an adhesive agent for the inner adhesive agent layer 15, and an ethylene-propylene random copolymer resin having a melting point of 140° C. and MFR of 7 g/10 min as the inner sealant layer 16, were extruded using a T-die method to prepare a laminated film in which the maleic acid-modified polypropylene resin layer was 7 μm and the ethylene-propylene random copolymer layer was 40 μm. That is, this laminated film is a film in which the inner sealant layer 16 having a thickness of 40 μm and the inner adhesive agent layer 15 having a thickness of 7 μm are laminated.

Next, the inner adhesive agent layer 15 of the laminated film was overlapped onto the other surface of the metallic foil layer 11, and it was passed through heat rolls heated to 150° C. to obtain the five-layer structure laminated body 10. The molding packaging materials of Examples 1 to 10 were produced by commonly using the produced laminated body 10.

The resin composition for the protection coat layer 14 was prepared by blending 15 mass parts of a curing agent to 100 mass parts of a main resin, wherein the main resin was produced by blending a urethane resin at a ratio as shown in Table 1 to 1 phenoxy resin in mass, and the curing agent was produced by blending tolylene diisocianate (TDI) and hexamethylene diisocyanate (HDI) at a mass ratio of 1:1.

The produced resin composition was applied to the surface of the outer substrate layer 13 of the laminated body 10 by a gravure roll, and then dried to form a protection coat layer 14. The thickness of the protection coat layer 14 after drying was shown in Table 1. The molding packaging material 1 was obtained in this manner.

Comparative Example 1

The five-layer structure laminated body 10 used in Examples 1 to 10 was used as a molding packaging material. That is, the molding packaging material of Comparative Example 1 does not have a protection coat layer 14.

Comparative Example 2

Except that a multi-layer film in which a PET film having a thickness of 12 μm and a biaxially stretched polyamide 6 film having a thickness of 15 μm were laminated was used as an outer substrate layer, the laminated body was produced by the same method as in Examples 1 to 10, and this was used as a molding packaging material. The molding packaging material of Comparative Example 2 was a six-layer structure laminated body, and the outermost layer was a PET film.

Comparative Example 3

Except that only the urethane resin was used as the resin component of the resin composition of the protection coat layer 14, the protection coat layer was formed on the five-layer structure laminated body 10 by the same method as in Examples 1 to 10. That is, the resin composition was produced by blending 15 mass parts of a curing agent in which TDI and HDI were mixed at 1:1 to 100 mass parts of a urethane resin.

Comparative Example 4

Except that the thickness of the protection coat layer 14 was set to the thickness shown in Table 1, the molding packaging material was produced by the same method as in Example 6.

For each of the molding packaging materials obtained as described above, performance evaluations were performed for the following items. The results are shown in Table 1.

<Moldability>

The molding packaging material was subjected to bulging of 55 mm long×35 mm wide using a bulging device produced by Amada, Co., Ltd. (Product number: TP-25C-X2). For the depth of molding, it was performed until a pinhole or a breakage occurred at the rounded portions of the corners of the molded product, and the moldability was evaluated according to the following standards depending on the molding limit value in which no breakage occurs.

"○" . . . molding limit value is 7.5 mm or more
"Δ" . . . molding limit value is less than 7.5 mm <Electrolyte Resistance>

To evaluate the chemical resistance and the solvent resistance, an electrolyte made of a solution in which lithium hexafluorophosphate salt was dissolved in a mixed solvent in which ethylene carbonate and diethylene carbonate were mixed at a 1:1 volumetric ratio so that the density became 1 mol/L was poured on the outermost layer of the molding packaging material, and the electrolyte was wiped off with ethanol after leaving it at room temperature for 24 hours. Then, it was evaluated according to the following standards based on the degree of discoloration after wiping off the electrolyte.

"○" . . . no change in color
"Δ" . . . slight change in color, but unnoticeable
"X" . . . change in color <Curling Properties>

When a molding packaging material cut into 100 mm×100 mm was placed on a flat platform,
"○" . . . there was curling and the height was 10 mm or less or there was no curling
"Δ" . . . there was curling exceeding 10 mm <Adhesion to Sealing Plate at the Time of Heat Sealing (Adhesion to Seal Bar)>

Two molding packaging materials were overlapped in a manner such that the inner sealant layers came in contact with each other, and they were sandwiched and maintained for 5 seconds with a pair of seal bars heated to 210° C. to subject the inner sealant layers to thermal fusion. At this time, whether or not the resin of the outer layer adheres to the seal bar was evaluated according to the following standards.

"○" . . . the outer layer did not adhere to the seal bar, and the molding packaging material was not lifted with the elevating seal bar
"Δ" . . . the outer layer lightly adhered to the seal bar, but the molding packaging material was not lifted with the elevating seal bar
"X" . . . the outer layer adhered to the seal bar, and the molding packaging material was lifted with the elevating seal bar <Scratch Resistance>

A molding packaging material cut into 100 mm×200 mm was placed on a flat platform with the outer layer surface facing up, and an iron jig having a load of 450 g and equipped with a tip having a flat surface with a diameter of 10 mm was reciprocated 20 times (length of reciprocation was 100 mm). Afterward, the surface of the molding packaging material was visually observed, and whether or not there were scratches was evaluated according to the following standards.

"○" . . . there were no scratches
"Δ" . . . there were slight scratches, but they were unnoticeable
"X" . . . there were scratches

TABLE 1

| | Structure of Protection Coat Layer | | | Thickness of Each Layer (μm) | | | | Moldability | | Electrolyte Resistance | Curling | Adhesion to Seal Plate at the time of Heat Sealing | Scratch Resistance |
|---|---|---|---|---|---|---|---|---|---|---|---|---|---|
| | Main agent resin | Ratio of Urethane Resin to Phenoxy Resin | Curing Agent | Protection Coat Layer | Outer Substrate Layer PET | Outer Substrate Layer Polyamide | Metallic foil layer | Inner sealant layer | Limit value (μm) | Evaluation | | | | |
| Ex. 1 | Phenoxy/Urethane | 0.6 | TDI/HDI | 2 | — | 25 | 40 | 40 | 7.5 | ○ | ○ | ○ | ○ | ○ |
| Ex. 2 | Phenoxy/Urethane | 0.8 | TDI/HDI | 2 | — | 25 | 40 | 40 | 7.5 | ○ | ○ | ○ | ○ | ○ |
| Ex. 3 | Phenoxy/Urethane | 1 | TDI/HDI | 2 | — | 25 | 40 | 40 | 7.5 | ○ | ○ | ○ | ○ | ○ |
| Ex. 4 | Phenoxy/Urethane | 1.2 | TDI/HDI | 2 | — | 25 | 40 | 40 | 7.5 | ○ | ○ | ○ | ○ | ○ |

TABLE 1-continued

| | Structure of Protection Coat Layer | | | Thickness of Each Layer (μm) | | | | Moldability | | Electro- | Adhesion to Seal Plate at the | |
|---|---|---|---|---|---|---|---|---|---|---|---|---|
| | | Ratio of Urethane | | | Outer | | | | | | | |
| | Main agent resin | Resin to Phenoxy Resin | Curing Agent | Protection Coat Layer | Substrate Layer PET | Substrate Layer Polyamide | Metallic foil | Inner sealant layer | Limit value (μm) | Evaluation | lyte Resistance | time of Heat Curling Sealing | Scratch Resistance |
| Ex. 5 | Phenoxy/Urethane | 1.6 | TDI/HDI | 2 | — | 25 | 40 | 40 | 8.0 | ○ | ○ | ○ ○ | ○ |
| Ex. 6 | Phenoxy/Urethane | 1.2 | TDI/HDI | 0.5 | — | 25 | 40 | 40 | 7.5 | ○ | ○ | ○ ○ | ○ |
| Ex. 7 | Phenoxy/Urethane | 1.2 | TDI/HDI | 5 | — | 25 | 40 | 40 | 7.5 | ○ | ○ | ○ ○ | ○ |
| Ex. 8 | Phenoxy/Urethane | 1.2 | TDI/HDI | 10 | — | 25 | 40 | 40 | 7.5 | ○ | ○ | ○ ○ | ○ |
| Ex. 9 | Phenoxy/Urethane | 0.5 | TDI/HDI | 2 | — | 25 | 40 | 40 | 7.5 | ○ | ○ | ○ ○ | ○ |
| Ex. 10 | Phenoxy/Urethane | 2 | TDI/HDI | 2 | — | 25 | 40 | 40 | 7.5 | ○ | △ | ○ △ | ○ |
| Co. Ex. 1 | — | — | — | — | — | 25 | 40 | 40 | 8.0 | ○ | x | △ x | △ |
| Co. Ex. 2 | PET | — | — | — | 12 | 15 | 40 | 40 | 5.5 | x | ○ | ○ ○ | ○ |
| Co. Ex. 3 | Urethane | — | TDI/HDI | 2 | — | 25 | 40 | 40 | 7.5 | ○ | x | ○ ○ | ○ |
| Co. Ex. 4 | Phenoxy/Urethane | 1.2 | TDI/HDI | 0.05 | — | 25 | 40 | 40 | 7.5 | ○ | △ | ○ △ | △ |

In the comparison of Examples 1 to 10 and the Comparative Examples 1 and 4, the electrolyte resistance was improved by forming the protection coat layer. In Examples 1 to 10, the moldability was also excellent, and the deterioration of moldability due to the forming of the protection coat layer was not evident. Further, by forming the protection coat layer, occurrences of scratches could be suppressed and the outermost layer resin could be prevented from adhering to the seal bar at the time of heat sealing. On the other hand, in Comparative Example 1 which did not have a protection coat layer, the electrolyte resistance was poor, and in Comparative Example 4 having insufficient thickness of the protection coat layer, no electrolyte resistance improvement effect was recognized. Since the outermost layer of Comparative Example 2 was PET, the electrolyte resistance was excellent but there was a problem with moldability, and the manufacturing cost became higher by using a multi-layer film as an outer layer. In Comparative Example 3, although the moldability was excellent since the protection coat layer is constituted with a urethane resin and a curing agent, the electrolyte resistance was poor.

The present invention claims priority to Japanese Patent Application No. 2014-200099 filed on Sep. 30, 2014, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

The molding packaging material and the molded case according to the present invention can be preferably used as a case for lithium-ion secondary batteries, etc., a packaging material for food products, and a packaging material for pharmaceutical products.

The invention claimed is:

1. A molding packaging material comprising:
   an outer substrate layer made of a heat-resistant resin;
   an inner sealant layer made of a thermoplastic resin;
   a metallic foil layer arranged between the outer substrate layer and the inner sealant layer; and
   a protection coat layer formed on a side opposite to the metallic foil layer side of the outer substrate layer, wherein
   the protection coat layer is made of a resin composition including a main resin containing a phenoxy resin and a urethane resin, and a curing agent, and has a thickness of 0.1 μm to 10 μm;
   the curing agent is an isocyanate component; and
   an amount of the curing agent in the resin composition is 5 to 30 mass parts to 100 mass parts of the main resin.

2. The molding packaging material as recited in claim 1, wherein a mass ratio of the phenoxy resin and the urethane resin in the main resin is 0.6 to 1.6 urethane resin to 1 phenoxy resin.

3. The molding packaging material as recited in the claim 1, wherein the outer substrate layer is made of a polyamide resin.

4. The molding packaging material as recited in claim 1, wherein a thickness of the metallic foil layer is 10 μm to 40 μm.

5. A molded case made by subjecting the molding packaging material as recited in claim 1 to deep-drawing or bulging.

6. The molded case as recited in claim 5, wherein the molded case is used as a battery case.

7. The molding packaging material as recited in claim 1, wherein a viscosity of a solution including the main resin and the curing agent of the resin composition and having a solid content concentration of 25 mass % at 20° C. measured with a #4 Zahn cup is in a range of 10 to 30 seconds.

8. A molding packaging material comprising:
an outer substrate layer made of a heat-resistant resin;
an inner sealant layer made of a thermoplastic resin;
a metallic foil layer arranged between the outer substrate layer and the inner sealant layer; and
a protection coat layer formed on a side opposite to the metallic foil layer side of the outer substrate layer; wherein
the protection coat layer is made of a resin composition including a main resin and a curing agent, and has a thickness of 0.1 μm to 10 μm;
the main resin contains a phenoxy resin, a urethane resin, and a resin including fluorine and an acrylate resin;
the curing agent is an isocyanate component; and
an amount of the curing agent in the resin composition is 5 to 30 mass parts to 100 mass parts of the main resin.

* * * * *